(12) United States Patent
Love

(10) Patent No.: US 9,179,655 B1
(45) Date of Patent: Nov. 10, 2015

(54) FISHING LURE

(71) Applicant: Leslie S. Love, Billings, MT (US)

(72) Inventor: Leslie S. Love, Billings, MT (US)

( * ) Notice: Subject to any disclaimer, the term of this patent is extended or adjusted under 35 U.S.C. 154(b) by 0 days.

(21) Appl. No.: 14/685,987

(22) Filed: Apr. 14, 2015

(51) Int. Cl.
  *A01K 85/12* (2006.01)
  *A01K 85/00* (2006.01)
  *A01K 85/01* (2006.01)
  *A01K 85/10* (2006.01)

(52) U.S. Cl.
  CPC ............. *A01K 85/12* (2013.01); *A01K 85/00* (2013.01); *A01K 85/01* (2013.01); *A01K 85/10* (2013.01)

(58) Field of Classification Search
  CPC .............................. A01K 85/10; A01K 85/12
  USPC ..................... 43/42.16, 42.17, 42.19
  See application file for complete search history.

(56) References Cited

U.S. PATENT DOCUMENTS

| | | | | |
|---|---|---|---|---|
| 861,116 A * | 7/1907 | Heddon | ............. | A01K 85/16 43/42.04 |
| 881,805 A * | 3/1908 | Klein | ............. | A01K 85/16 43/42.17 |
| 1,154,168 A * | 9/1915 | Bosserman | ............. | A01K 85/02 43/42.06 |
| 1,226,891 A * | 5/1917 | Jay | ............. | D06F 53/00 24/131 R |
| 1,247,955 A * | 11/1917 | Grube | ............. | A01K 85/16 43/42.17 |
| 1,434,204 A * | 10/1922 | Grounsell | ............. | A01K 85/16 43/42.05 |
| 1,495,927 A * | 5/1924 | Roland | ............. | A01K 85/16 43/26.2 |
| 1,535,957 A * | 4/1925 | Stanley | ............. | A01K 85/16 43/42.17 |
| 1,812,782 A * | 6/1931 | Gluck | ............. | A01K 85/12 43/42.17 |
| 2,437,803 A * | 3/1948 | Bell | ............. | A01K 85/12 43/42.46 |
| 2,926,451 A * | 3/1960 | Leba | ............. | A01K 85/12 43/42.14 |
| 3,012,357 A * | 12/1961 | Helin | ............. | A01K 85/12 43/42.17 |
| 4,450,644 A * | 5/1984 | Leal | ............. | A01K 85/12 43/42.2 |
| 4,679,347 A | 7/1987 | Stirtz | | |
| 4,916,854 A * | 4/1990 | Martin | ............. | A01K 85/12 43/42.16 |
| 5,566,497 A | 10/1996 | Oesterreich | | |
| 2006/0201050 A1 * | 9/2006 | Troutman | ............. | A01K 85/00 43/42.19 |

OTHER PUBLICATIONS

"Spinner Blades: Smile Blades & more", www.mackslure.com, archived Mar. 1, 2012, pp. 1-2.

* cited by examiner

*Primary Examiner* — Christopher Harmon
(74) *Attorney, Agent, or Firm* — Cahill Glazer PLC

(57) ABSTRACT

A fishing lure includes a blade having first and second opposing ends each having a generally circular periphery and connected by a central bridge portion having first and second parallel sides. The first and second sides extend substantially tangent to the peripheries of the first and second ends, respectively. A longitudinal axis of the blade passes through geometric centers of the first and second ends; a lateral axis extends perpendicular thereto. A spin hole is provided midway along the longitudinal axis for encircling the line, and a fold line is formed at a 15-degree offset from the lateral axis, passing through the spin hole, extending substantially perpendicular to the first and second sides of the bridge portion. The blade is folded about the fold line through an angle of 30 to 90 degrees, causing the blade to spin even when the lure is pulled through water at slow speeds.

20 Claims, 2 Drawing Sheets

FISHING LURE

BACKGROUND OF THE INVENTION

1. Field of the Invention

The present invention relates generally to fishing lures, and more particularly, to fishing lures that include spinning blades for reflecting light downwardly into water.

2. Description of the Related Art

Fishing is a popular form of recreation, and fisherman often compete for bragging rights as to landing the biggest fish from a particular body of water. One preferred form of fishing is known as trolling in which one or more fishing lines are baited with lures or bait fish, and are slowly drawn through the water. Fisherman troll for fish either by dragging one or more lines behind a moving boat, or by slowly reeling a line in when fishing from shore. When trolling from a boat, a special trolling motor is typically used to move the boat at a relatively slow, constant speed.

Fishing lures that spin, and reflect light, as they move through the water, have been in use for many years. So-called "spoons" include an elliptical piece of metal, resembling the working end of a dinner-table spoon. One or more hooks are attached to one end of the spoon, and the fishing line is attached to the other end of the spoon. As the lure is pulled through the water, the spoons rotate and reflect light, resembling the appearance of a minnow.

"Spinners" may include a wire shaft having loops or eyes at both ends, one for attaching the spinner to a fishing line, and the other for attachment to a hook. Often, a row of colored beads or metal rings or cylinders, are threaded onto the wire shaft to sparkle and glimmer. Near the upper eye of the wire shaft, a metal spinner blade is rotatably coupled to spin as the lure is pulled through the water. The metal spinner blade may be of various shapes and styles, including a so-called "Colorado" spinner that resembles a tear-drop shape. Rotational movement of such lures through the water as the lure is pulled, resulting vibration, together with the flashing patterns of light that are reflected into the water, are the features that are believed to attract fish to bite at the lure.

It has been found that some fish that are valued by fisherman are more likely to bite at, or "hit", a lure that advances more slowly through the water, for example, at speeds of as little as one-half mile per hour. However, many of the known fishing lures that are designed to spin in the water do not exhibit significant spin, or "flash", when pulled at such slow speeds.

While some fishing lures may be effective in attracting fish, they may nonetheless present disadvantages. For example, if a fishing lure creates excessive drag as it is pulled through the water, it may be more difficult for a fisherman to recognize that a fish has bit on the lure. On the other hand, a fishing lure that performs well might fail to succeed commercially if it costs significantly more to manufacture; fishing lure manufacturers and dealers are very competitive, and fisherman demand fishing lures that are reasonably priced.

Often fisherman desire to adjust, or "tweak", the characteristics of a fishing lure to account for varying circumstances. For example, a fisherman may wish to adjust a lure to increase, or decrease, the rate at which it spins for a given trolling speed.

U.S. Pat. No. 4,679,347 to Stirtz describes a fishing flasher including an elongated resilient blade. In one embodiment, the elongated blade is S-shaped, and in a second embodiment, the elongated blate is quarter-moon, or crescent, shaped. A braided wire leader is secured to the eye of a hook, and a series of beads are threaded over the braided-wire leader. The braided-wire leader extends through an aperture formed in the blade. Equal length blade segments extend about opposite sides of a fold line. The fold line is offset from a transverse axis of the blade by an angle of between 5 and 10 degrees. The bent portions of the blade are folded about the fold line to form an angle of between 30-60 degrees. At least some of the blade segment surfaces are reflective to reflect, or "flash", light downwardly into the water as the blade spins. The blade is formed from planar flexible plastic sheet material, such as 10-15 mil Mylar.

The crescent-shaped blade embodiment disclosed in the Stirtz patent described above has been commercially available since approximately 1997 under the federally-registered trademark "SMILE BLADES" from Mack's Lure, Inc. of Wenatchee, Wash. Crescent-shaped lure blades sold under the federally-registered trademark "SMILE BLADES" have included markings referencing U.S. Pat. No. 4,679,347. While such blades have become popular among fisherman, they still exhibit difficulty in spinning, and "flashing" light, when moved through the water at very low trolling speeds.

Accordingly, it is an object of the present invention to provide a fishing lure which is adapted to spin, and "flash" light into the water, even when the fishing lure is trolled at very slow speeds, e.g., one-half mile per hour.

It is another object of the present invention to provide a spinning blade for such a fishing lure to provide such benefits.

It is a further object of the present invention to provide such a fishing lure, and related blade, which avoid excessive drag, for allowing a fisherman to have better "feel" of the fishing line, and to react more quickly when a fish hits the fishing lure.

Still another object of the present invention is to provide such a fishing lure, and related blade, that can be manufactured relatively easily and inexpensively.

A still further object of the present invention is to provide such a fishing lure, and related blade, that allows a fisherman to quickly and easily modify the characteristics of the fishing lure to increase, or decrease, the rate at which it spins for a given trolling speed.

These and other objects of the invention will become more apparent to those skilled in the art as the description of the present invention proceeds.

SUMMARY OF THE INVENTION

Briefly described, and in accordance with a first preferred embodiment thereof, the present invention relates to a blade for a fishing lure. The fishing lure includes a hook attached to a line. In the context of the present application, the aforementioned "line" may include conventional monofilament fishing line, e.g., common types made of Nylon, polyethylene, Dacron, and the like. The aforementioned line may also include braided non-metallic fishing line, e.g., braided line made from several braided strands of Dyneema fiber which exhibit high strength and limited stretch. It may also include metal wire, including braided metal strands, as is commonly used for fishing line leaders. The blade includes first and second ends, each having a generally circular periphery, and each extending about its own geometric center. These first and second ends are connected by a central bridge portion having first and second opposing sides that extend generally parallel to each other. In the preferred embodiment, the first side of the bridge portion extends generally tangent to the periphery of the first end of the blade; likewise, the second side of the bridge portion extends generally tangent to the periphery of the second end of the blade.

In a preferred embodiment, the blade extends about a central longitudinal axis that passes substantially through geometric centers of the first and second ends of the blade; a lateral axis extends perpendicular to the longitudinal axis. A spin hole is formed in the blade, the spin hole being adapted to extend about the line attached to the hook of the fishing lure. Preferably, the spin hole is positioned substantially along the central longitudinal axis of the blade, and substantially midway between the first and second geometric centers of the first and second ends of the blade.

A fold line is formed in the central bridge portion of the blade. In the preferred embodiment, this fold line extends at approximately 15 angular degrees from the lateral axis of the blade; preferably, the fold line passes substantially through the spin hole. The central bridge portion of the blade is partially folded about the fold line to position the first and second ends of the blade in a configuration to cause the blade to spin when the fishing lure is pulled through water. Preferably, the central bridge portion of the blade is folded about the fold line through an angle that lies substantially in the range of 30-90 degrees.

As mentioned above, the central bridge portion of the blade has first and second opposing parallel sides; preferably, these first and second sides extend at an angle of approximately 15 degrees to the central longitudinal axis of the blade. As a result, the fold line preferably extends substantially perpendicular to the first and second opposing sides of the central bridge portion of the blade.

The first and second ends and central bridge portion of the blade are preferably formed from a single piece of plastic sheet material, as by stamping. In the preferred embodiment, this single piece of plastic sheet material is formed of polyvinyl chloride (PVC), Mylar, or the like, and preferably has a thickness of approximately 15 to 20 mils.

In one preferred embodiment, the single piece of plastic sheet material from which the blade is formed has first and second opposing surfaces, and a reflective film is secured to one of those surfaces to reflect light. Ideally, this reflective film is a holographic film. The plastic sheet material may be opaque and can be any desired color. In one embodiment, the plastic sheet material is substantially clear, wherein the film secured to one surface of the plastic sheet material is visible through the opposing surface thereof.

In another aspect, the present invention relates to a fishing lure that includes such a blade. The fishing lure includes a hook, a line having a first end attached to the hook, and having a second opposing end, and a blade for spinning as the fishing lure is pulled through water. As already summarized above, the blade includes first and second ends each having a generally circular periphery extending about a geometric center, and a central bridge portion connecting the first end to the second end. The bridge portion includes first and second opposing, substantially parallel, sides, wherein the first side extends substantially tangent to the periphery of the first end, and the second side extends substantially tangent to the periphery of the second end. The blade extends about a central longitudinal axis passing substantially through the first and second geometric centers, and a lateral blade axis extends perpendicular to the longitudinal axis. A spin hole is formed in the blade substantially along the central longitudinal axis thereof, and substantially midway between the first and second geometric centers, for extending about the line attached to the hook of the fishing lure. A fold line formed in the central bridge portion of the blade extends at an angle of approximately 15 degrees from the lateral axis of the blade, and substantially passes through the spin hole. The central bridge portion of the blade is partially folded about the fold line, preferably forming a fold angle of 30-90 degrees, to position the first and second ends of the blade in a configuration to cause the blade to spin when the fishing lure is pulled through water. The blade of the aforementioned fishing lure is preferably formed in the manner already summarized above.

DETAILED DESCRIPTION OF THE PREFERRED EMBODIMENTS

Figure 1:
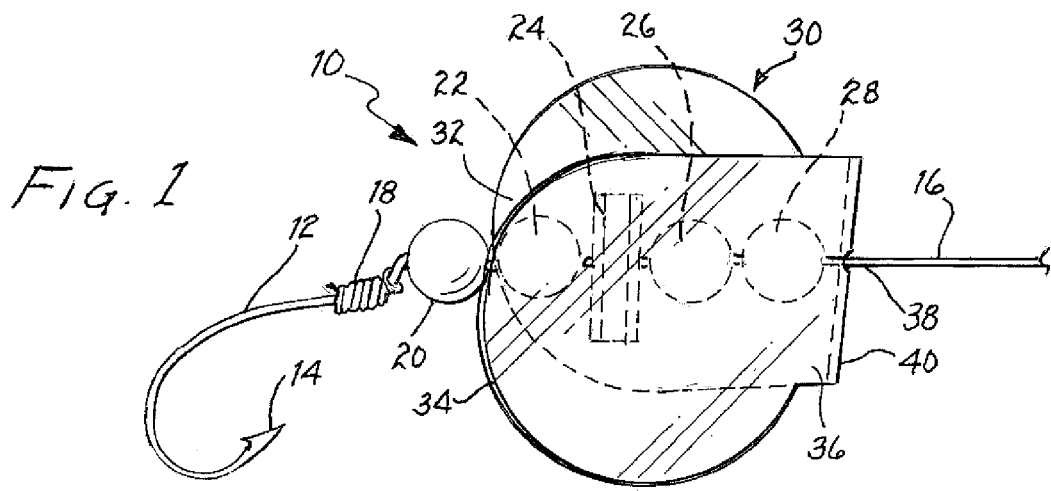
FIG. 1 is a side view of a fishing lure incorporating a folded spinning blade in accordance with a preferred embodiment of the present invention.
Figure 2:
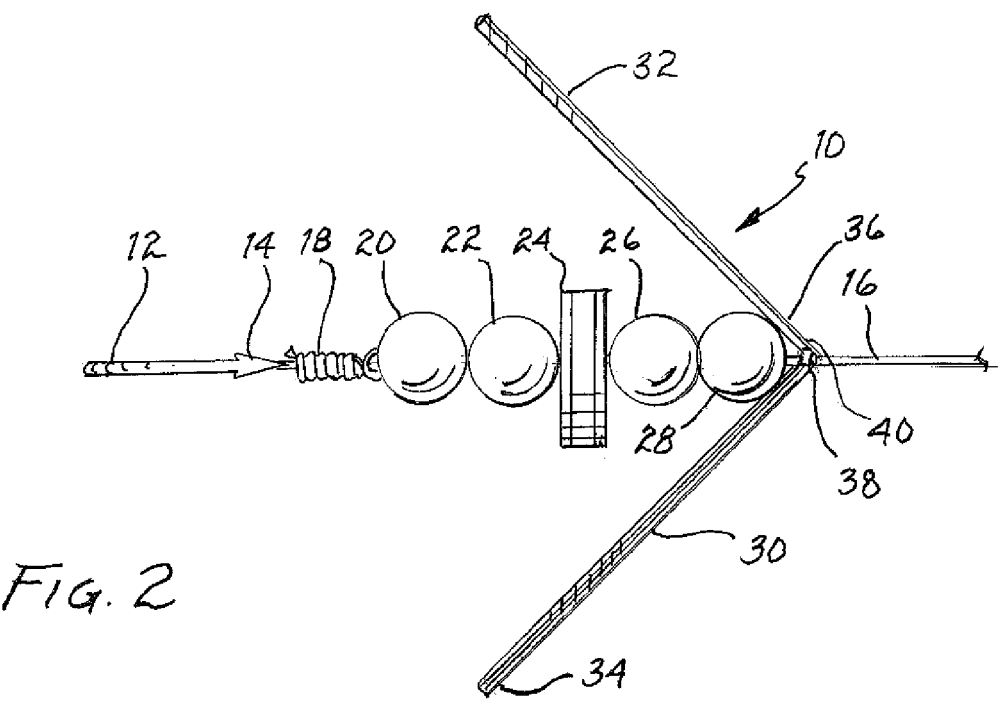
FIG. 2 is a top view of the fishing lure shown in FIG. 1.
Figure 3:
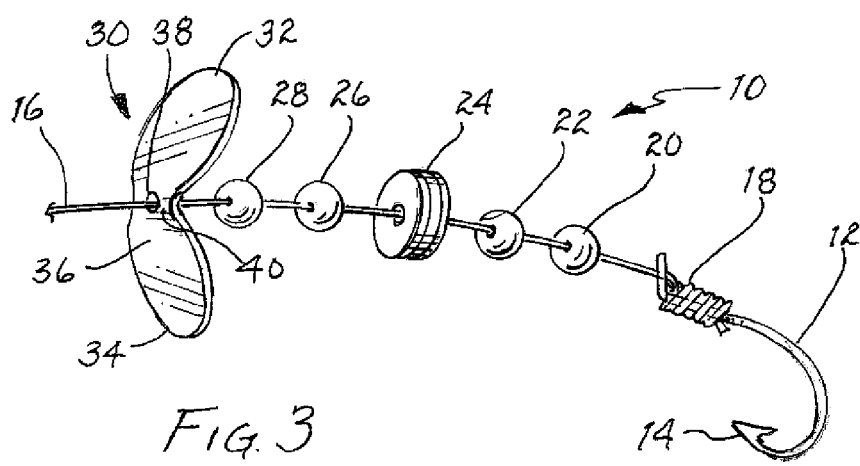
FIG. 3 is an exploded perspective view of the fishing lure shown in FIGS. 1 and 2 showing the individual components used to form the fishing lure.

Referring to FIGS. 1-3, fishing lure 10 includes a hook 12 having a barbed tip 14 at a first end thereof. The opposing end of hook 12 is tied to an end of line 16 by a fisherman's knot 18 secured to the eye of the hook. Threaded over line 16 are a series of beads 20, 22, 24, 26, and 28, the style, colors, shapes, and number of which can be modified to suit the preferences of a user.

Still referring to FIGS. 1-3, fishing lure 10 also includes a blade 30, the geometry of which will be discussed below in conjunction with FIG. 4. Blade 30 is configured to spin when fishing lure 10 is pulled through water during trolling. Blade 30 has a first end 32 having a generally circular periphery. Blade 30 also has an opposing second end 34 which likewise has a generally circular periphery. Opposing end portions 32 and 34 of blade 30 are interconnected by a central bridge portion 36.

A spin hole 38 is formed in blade 30, preferably at the center point in bridge portion 36. Spin hole 38 is of sufficient diameter to extend about line 16, and to permit blade 30 to freely spin about line 16. A fold line 40 is formed in central bridge portion 36, preferably passing through spin hole 38. Further details regarding the geometry of the fold line are provided below in conjunction with FIG. 4. Central bridge portion 36 of blade 30 is partially folded about fold line 40 to position first end 32 and second end 34 of blade 30 in a configuration to cause blade 30 to spin when fishing lure 10 is trolled through water.

The rate at which blade 30 will spin, as fishing lure 10 is pulled through the water, is affected by the amount by which blade 30 is folded about its fold line. If blade 30 is not folded at all, blade 30 will not spin. Initially, as blade 30 is folded out of its original planar orientation, the spin rate increases. However, as the degree to which blade 30 is folded is further increased, the spin rate reaches a peak and then decreases. Preferably, blade 30 is partially folded out of its original planar configuration through an angle of between 30 degrees to 90 degrees, whereby the interior angle formed between the portion of blade 30 that includes first end 32, and the portion of blade 30 that includes second end 34, is substantially between 150 degrees (for a 30 degree fold) and 90 degrees (for a 90 degree fold). For example, in FIG. 2, the angle formed between the two folded portions of blade 30 is approximately 90 degrees (corresponding to a folding of blade 30 about its fold line 40 through an angle of 90 degrees).

Generally speaking, for a given trolling speed, the more blade 30 is bent within the specified 30-90 degree range, the slower the rate at which blade 30 will spin. Thus, a blade folded about its fold line through an angle of 60 degrees will spin more slowly than the same blade folded about its fold line through an angle of 30 degrees.

In the preferred embodiment of the invention, blade 30 is formed, as for example, by stamping, from a single piece of plastic sheet material. Thus, first end 32, second end 34, and central bridge portion 36 are integrally formed from a single piece of plastic sheet material. The plastic sheet material may be formed of polyvinyl chloride (PVC), Mylar, or other workable plastics. In the preferred embodiment, PVC sheet material having a thickness of approximately 15 to 20 mils (i.e., 0.015-0.020 inch) has been found to provide a blade which is easily stamped and folded, and which retains a set amount of fold. Nonetheless, such sheet material is sufficiently pliable to allow a user to manually increase or decrease the amount of fold when desired, thereby allowing a fisherman to quickly and easily modify the characteristics of the fishing lure to increase, or decrease, the rate at which it spins for a given trolling speed.

The aforementioned plastic sheet material may be opaque and have a variety of solid or patterned colors. Alternatively, for reasons explained in greater detail below, the plastic sheet material may be substantially clear, as by using clear polyvinyl chloride (PVC). Suitable opaque PVC sheet material may be obtained, for example, in 25 inch wide by 52 inch long sheets from K & R Plastics of Austin, Tex., in a variety of colors. The applicant prefers a bright orange to attract fish, but the colors red, green and black have also been found to be desirable under different circumstances.

Figure 4:
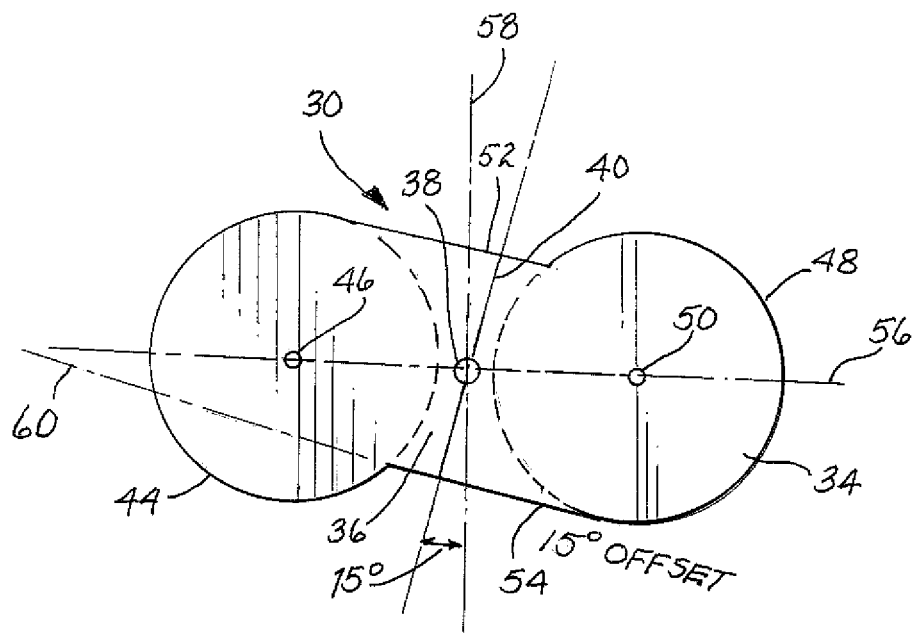
FIG. 4 is a top, or plan, view of the blade portion of the fishing lure before the blade is folded about its fold line.

Turning now to FIG. 4, blade 30 is shown in "plan" view, i.e., before folding. First end 32 of blade 30 has a generally circular periphery 44 encircling a first geometric center designated by reference numeral 46. Likewise, second end 34 of blade 30 has a generally circular periphery 48 encircling a second geometric center 50. The overall length of blade 30 can vary from less than one inch to approximately one and one-half inches.

Still referring to FIG. 4, blade 30 also includes central bridge portion 36 interconnecting end portions 32 and 34. Bridge portion 36 includes first and second opposing sides 52 and 54 that extend substantially parallel to each other. First side 52 extends substantially tangent to periphery 44 of first end 32; second side 54 of bridge portion 36 extends substantially tangent to periphery 48 of second end 34.

Dashed line 56 in FIG. 4 represents the longitudinal axis of blade 30. Longitudinal axis 56 passes substantially through both first geometric center 46 and second geometric center 50. In the preferred embodiment, spin hole 38 is also substantially centered on longitudinal axis 56 to maximize the amount to which blade 30 spins; preferably, spin hole 38 lies midway between first geometric center 46 and second geometric center 50. In FIG. 4, dashed line 58 represents the lateral axis of blade 30, which extends perpendicular to longitudinal axis 56 and intersects therewith midway between first geometric center 46 and second geometric center 50. As further indicated in FIG. 4, second side 54 of bridge portion 36 extends at an angle to longitudinal axis 56; dashed line 60 is an extension of second side 54, and dashed line 60 intersects longitudinal axis 56 to form an acute angle therewith. In the preferred embodiment, this acute angle is approximately 15 degrees. Likewise, first side 52 of bridge portion 36, which is substantially parallel to second side 54, also extends at an angle of approximately 15 degrees relative to central longitudinal axis 56.

As shown in FIG. 4, fold line 40 extends across bridge portion 36 intersecting the center of spin hole 38 and substantially perpendicular to first and second sides 52 and 54. Fold line 40 extends at approximately 15 angular degrees from lateral axis 58 of blade 30. This amount of offset between fold line 40 and lateral axis 58 is sufficient to induce a desired spin of blade 30 as blade 30 is pulled through the water. Applicant has found that blade 30 will exhibit significant spin in the water even when the fishing line is trolled at a speed of as little as one-half mile per hour; no other commercially available spinner lures, or spoons, known to Applicant will exhibit significant spin at such low trolling speeds.

Figure 5:
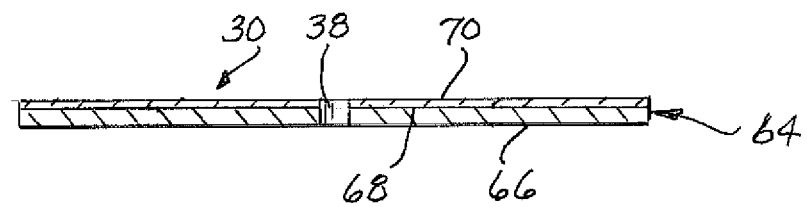
FIG. 5 is a cross-sectional side view of the blade of FIG. 4 showing a film layer secured over a plastic base layer.

Referring now to FIG. 5, blade 30 is shown in cross-section along longitudinal axis 56 (see FIG. 4) to illustrate another aspect of the invention. In FIG. 5, lower layer 64 designates the plastic sheet material described above. Lower layer 64 includes a lower surface 66 and an opposing upper surface 68. Secured to upper surface 66 is an upper layer 70 representing an optional film. Film 70 may be a reflective film to aid in reflecting ambient light into the water to further attract fish by increasing the "flash" of the lure. Film 70 may also be a holographic film having both a pattern and reflective characteristics. Blade 30 may thereby present different appearances depending upon which face of the blade is presented. For example, the forwardmost faces of blade 30 (represented by the exposed surface of film 70) may be silver-colored and reflective, while the rearmost faces of blade 30 (represented by lower surface 66 of plastic layer 64) may be bright orange. If desired, plastic layer 64 may be substantially clear, as by using clear PVC sheet material, to allow the color or pattern of film 70 to be visible from both the front and back of blade 30.

Suitable reflective and/or holographic films 70 may be obtained from WTP Inc. of Coloma, Mich. Such films can be obtained in 100-foot rolls with a pressure-sensitive, waterproof adhesive backing During manufacture of the blade shown in FIG. 5, plastic sheet material layer 64 may be cut into three-quarter inch wide strips to match the width of rolls of film 70. The film is laminated over the upper surface of the strips of plastic sheet material, and blades 30 having the general configuration shown in FIG. 4 may be stamped therefrom, including spin hole 38. The stamped blades may then be folded about fold line 40 in the manner explained above to produce a finished blade 30.

Those skilled in the art will now appreciate that a blade for a fishing lure has been described which is adapted to spin, and "flash" light into the water, even when the fishing lure is trolled at very slow speeds, e.g., one-half mile per hour. When incorporated into a fishing lure, the above-described blade provides a fishing lure that more easily attracts fish. The disclosed blade and fishing lure do not exhibit excessive drag, so a fisherman can quickly feel when a fish has hit the lure. The disclosed blade and lure can be manufactured relatively easily and inexpensively using materials and processes that are already readily available. The disclosed blade is made of material that takes a "set" and remembers how much it was folded, but still allows a fisherman to adjust the amount by which the blade is folded to increase, or decrease, the rate at which it spins for a given trolling speed. Those skilled in the art will further appreciate that the basic fishing lure disclosed herein could be modified to add swivels, sinkers, or other fishing tackle accessories to suit the needs of the user.

While the present invention has been described with respect to preferred embodiments thereof, such description is for illustrative purposes only, and is not to be construed as limiting the scope of the invention. Various modifications and changes may be made to the described embodiments by those skilled in the art without departing from the true spirit and scope of the invention as defined by the appended claims.

I claim:

1. A blade for a fishing lure, the fishing lure including a hook attached to a line, the blade comprising in combination:
   a) a first end having a generally circular periphery extending about a first geometric center;
   b) a second end having a generally circular periphery extending about a second geometric center;
   c) a central bridge portion connecting the first end to the second end, the bridge portion including first and second opposing sides, the first and second opposing sides being substantially parallel to each other, the first side extending substantially tangent to the periphery of the first end, and the second side extending substantially tangent to the periphery of the second end;
   d) the blade extending about a central longitudinal axis passing substantially through the first and second geometric centers, and extending about a lateral axis perpendicular to the longitudinal axis;
   e) a spin hole formed in the blade substantially along the central longitudinal axis thereof, and substantially midway between the first and second geometric centers, the spin hole being adapted to extend about the line attached to the hook of the fishing lure; and
   f) a fold line formed in the central bridge portion, the fold line extending at approximately 15 angular degrees from the lateral axis of the blade, and substantially passing through the spin hole;
   g) wherein the central bridge portion of the blade is partially folded about the fold line to position the first and second ends of the blade in a configuration to cause the blade to spin when the fishing lure is pulled through water.

2. The blade recited by claim 1 wherein the central bridge portion of the blade is folded about the fold line through an angle substantially in the range of 30 degrees to 90 degrees.

3. The blade recited by claim 1 wherein the first and second opposing sides of the central bridge portion each extend at an angle of approximately 15 angular degrees relative to the central longitudinal axis of the blade.

4. The blade recited by claim 3 wherein the fold line extends substantially perpendicular to the first and second opposing sides of the central bridge portion of the blade.

5. The blade recited by claim 1 wherein the first and second ends and the central bridge portion comprise a single piece of plastic sheet material.

6. The blade recited by claim 5 wherein the single piece of plastic sheet material is formed of polyvinyl chloride (PVC).

7. The blade recited by claim 5 wherein the single piece of plastic sheet material has a thickness of approximately 15 to 20 mils.

8. The blade recited by claim 5 wherein the single piece of plastic sheet material has first and second opposing surfaces, and further including a reflective film secured to one of the opposing surfaces of the single piece of plastic sheet material.

9. The blade recited by claim 8 wherein the reflective film is a holographic film.

10. The blade recited by claim 5 wherein the single piece of plastic sheet material is substantially clear and has first and second opposing surfaces, the blade further including a film secured to one of the opposing surfaces of the single piece of plastic sheet material, wherein the film secured to one of the opposing surfaces of the plastic sheet material is visible through the opposing surface thereof.

11. A fishing lure, the fishing lure comprising in combination:
   a) a hook;
   b) a line having a first end attached to the hook and a second opposing end;
   c) a blade for spinning as the fishing lure is pulled through water, the blade including:
      i) a first end having a generally circular periphery extending about a first geometric center;
      ii) a second end having a generally circular periphery extending about a second geometric center;
      iii) a central bridge portion connecting the first end to the second end, the bridge portion including first and second opposing sides, the first and second opposing sides being substantially parallel to each other, the first side extending substantially tangent to the periphery of the first end, and the second side extending substantially tangent to the periphery of the second end;
      iv) the blade extending about a central longitudinal axis passing substantially through the first and second geometric centers, and extending about a lateral axis perpendicular to the longitudinal axis;
      v) a spin hole formed in the blade substantially along the central longitudinal axis thereof, and substantially midway between the first and second geometric centers, the spin hole being adapted to extend about the line attached to the hook of the fishing lure; and
      vi) a fold line formed in the central bridge portion, the fold line extending at approximately 15 angular degrees from the lateral axis of the blade, and substantially passing through the spin hole;
      vii) wherein the central bridge portion of the blade is partially folded about the fold line to position the first and second ends of the blade in a configuration to cause the blade to spin when the fishing lure is pulled through water.

12. The fishing lure recited by claim 11 wherein the central bridge portion of the blade is folded about the fold line through an angle substantially in the range of 30 degrees to 90 degrees.

13. The fishing lure recited by claim 11 wherein the first and second opposing sides of the central bridge portion each extend at an angle of approximately 15 angular degrees relative to the central longitudinal axis of the blade.

14. The fishing lure recited by claim 13 wherein the fold line extends substantially perpendicular to the first and second opposing sides of the central bridge portion of the blade.

15. The fishing lure recited by claim 11 wherein the first and second ends and the central bridge portion of the blade comprise a single piece of plastic sheet material.

16. The fishing lure recited by claim 15 wherein the single piece of plastic sheet material is formed of polyvinyl chloride (PVC).

17. The fishing lure recited by claim 15 wherein the single piece of plastic sheet material has a thickness of approximately 15 to 20 mils.

18. The fishing lure recited by claim 15 wherein the single piece of plastic sheet material has first and second opposing surfaces, and further including a reflective film secured to one of the opposing surfaces of the single piece of plastic sheet material.

19. The fishing lure recited by claim 18 wherein the reflective film is a holographic film.

20. The fishing lure recited by claim 15 wherein the single piece of plastic sheet material is substantially clear and has first and second opposing surfaces, the blade further including a film secured to one of the opposing surfaces of the single piece of plastic sheet material, wherein the film secured to one of the opposing surfaces of the plastic sheet material is visible through the opposing surface thereof.

* * * * *